United States Patent
Sheynblat et al.

(10) Patent No.: US 7,831,263 B2
(45) Date of Patent: *Nov. 9, 2010

(54) APPARATUS AND METHOD FOR DETERMINING THE LOCATION OF A REPEATER

(75) Inventors: Leonid Sheynblat, Hillsborough, CA (US); Kenneth Baker, Boulder, CO (US); Charles Wheatley, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/703,131

(22) Filed: Nov. 5, 2003

(65) Prior Publication Data

US 2004/0147221 A1    Jul. 29, 2004

Related U.S. Application Data (60) Provisional application No. 60/424,821, filed on Nov. 8, 2002, provisional application No. 60/436,393, filed on Dec. 23, 2002.

(51) Int. Cl.
*H04W 24/00* (2009.01)
(52) U.S. Cl. .................. 455/456.5; 455/456.1; 455/11.1; 455/13.1
(58) Field of Classification Search .............. 455/456.1, 455/456.2, 456.3, 456.5, 456.6, 404.2, 11.1, 455/556.1, 557; 370/315; 342/357.09, 357.01; 701/200, 300
See application file for complete search history.

(56) References Cited

U.S. PATENT DOCUMENTS

| | | | |
|---|---|---|---|
| 3,670,249 A | 6/1972 | Meslener et al. | |
| 4,723,320 A | 2/1988 | Horton | |
| 4,901,307 A | 2/1990 | Gilhousen et al. | |
| 4,993,021 A | 2/1991 | Nannicini et al. | |
| 5,056,109 A | 10/1991 | Gilhousen et al. | |
| 5,103,459 A | 4/1992 | Gilhousen et al. | |
| 5,210,632 A | 5/1993 | Murakami et al. | |
| 5,355,511 A | 10/1994 | Hatano et al. .............. 455/11.1 |
| 5,383,219 A | 1/1995 | Wheatley, III et al. | |
| 5,396,516 A | 3/1995 | Padovani et al. | |
| 5,440,418 A | 8/1995 | Ishimura et al. | |

(Continued)

FOREIGN PATENT DOCUMENTS

EP     0588598 A1    3/1994

(Continued)

OTHER PUBLICATIONS

JP2001-209891—Patent Abstracts of Japan, Matshushita Electric Works Ltd, Aug. 3, 2001.

(Continued)

*Primary Examiner*—Jean A Gelin
(74) *Attorney, Agent, or Firm*—Kevin T. Cheatham; Linda G. Gunderson (57) ABSTRACT

A repeater is disclosed with position location capability. The repeater includes a position location device for determining the location of the repeater. The position location device uses radio-location signals received independently or by a receiver to determine the location of the repeater. The location of the repeater can be used to update a base station almanac.

24 Claims, 9 Drawing Sheets

U.S. PATENT DOCUMENTS

| | | | |
|---|---|---|---|
| 5,507,452 A * | 4/1996 | Mayersak | 244/3.15 |
| 5,608,393 A * | 3/1997 | Hartman | 340/988 |
| 5,626,630 A | 5/1997 | Markowitz et al. | 607/60 |
| 5,646,630 A | 7/1997 | Sheynblat et al. | |
| 5,812,933 A | 9/1998 | Niki et al. | |
| 5,815,795 A | 9/1998 | Iwai et al. | |
| 5,910,943 A | 6/1999 | Wickman et al. | |
| 5,991,345 A | 11/1999 | Ramasastry et al. | |
| 6,052,558 A | 4/2000 | Cook et al. | |
| 6,108,364 A | 8/2000 | Weaver, Jr. et al. | |
| 6,118,809 A | 9/2000 | Lo | |
| 6,147,981 A | 11/2000 | Prescott et al. | |
| 6,185,429 B1 | 2/2001 | Gehrke et al. | |
| 6,188,719 B1 | 2/2001 | Collomby | 375/211 |
| 6,266,008 B1 | 7/2001 | Huston et al. | |
| 6,272,316 B1 | 8/2001 | Wiedeman et al. | |
| 6,307,504 B1 | 10/2001 | Sheynblat | |
| 6,317,420 B1 | 11/2001 | Schiff et al. | |
| 6,346,911 B1 | 2/2002 | King et al. | |
| 6,347,216 B1 | 2/2002 | Marko et al. | |
| 6,349,211 B2 | 2/2002 | Koshima et al. | |
| 6,377,792 B1 | 4/2002 | Brown et al. | |
| 6,404,775 B1 | 6/2002 | Leslie et al. | |
| 6,415,155 B1 * | 7/2002 | Koshima et al. | 455/456.1 |
| 6,429,808 B1 | 8/2002 | King et al. | |
| 6,430,415 B1 | 8/2002 | Agashe et al. | |
| 6,501,955 B1 | 12/2002 | Durrant et al. | |
| 6,507,741 B1 | 1/2003 | Bassirat | |
| 6,515,975 B1 | 2/2003 | Chheda et al. | |
| 6,615,021 B1 | 9/2003 | Lovinggood et al. | |
| 6,690,657 B1 | 2/2004 | Lau et al. | |
| 6,788,663 B2 | 9/2004 | Rowitch | |
| 6,889,033 B2 | 5/2005 | Bongfeldt et al. | |
| 6,901,264 B2 | 5/2005 | Myr et al. | |
| 6,901,268 B2 | 5/2005 | Chang et al. | |
| 6,999,778 B2 | 2/2006 | DiBuduo et al. | |
| 7,013,111 B2 | 3/2006 | Kuwahara et al. | |
| 7,020,436 B2 | 3/2006 | Schmutz et al. | |
| 7,027,773 B1 * | 4/2006 | McMillin | 455/41.2 |
| 7,039,418 B2 | 5/2006 | Amerga et al. | |
| 7,058,400 B2 | 6/2006 | Brooks et al. | |
| 7,062,224 B2 | 6/2006 | Baker et al. | |
| 7,068,973 B1 * | 6/2006 | Lovinggood et al. | 455/11.1 |
| 7,075,481 B2 | 7/2006 | Huston et al. | |
| 7,123,911 B1 | 10/2006 | Ngan et al. | |
| 7,139,580 B2 | 11/2006 | Stein et al. | |
| 7,218,275 B2 | 5/2007 | Han et al. | |
| 7,355,993 B2 | 4/2008 | Adkins et al. | |
| 2001/0031624 A1 | 10/2001 | Schmutz et al. | |
| 2001/0036833 A1 * | 11/2001 | Koshima et al. | 455/457 |
| 2001/0046878 A1 | 11/2001 | Chang | |
| 2002/0028655 A1 | 3/2002 | Rosener et al. | |
| 2002/0045431 A1 | 4/2002 | Bongfeldt et al. | |
| 2002/0070891 A1 * | 6/2002 | Huston et al. | 342/357.09 |
| 2002/0115448 A1 | 8/2002 | Amerga et al. | |
| 2002/0160813 A1 | 10/2002 | Miya et al. | |
| 2002/0167918 A1 | 11/2002 | Brewer et al. | |
| 2002/0183069 A1 * | 12/2002 | Myr | 455/456 |
| 2003/0008663 A1 | 1/2003 | Stein et al. | |
| 2003/0008669 A1 | 1/2003 | Stein et al. | |
| 2003/0023682 A1 | 1/2003 | Brown et al. | |
| 2003/0039267 A1 | 2/2003 | Koo et al. | |
| 2003/0076979 A1 | 4/2003 | Matsui et al. | |
| 2003/0083008 A1 | 5/2003 | Baker et al. | |
| 2003/0086401 A1 | 5/2003 | Lee et al. | |
| 2003/0123401 A1 | 7/2003 | Dean | |
| 2003/0151506 A1 * | 8/2003 | Lucckletti | 340/539.13 |
| 2003/0162550 A1 * | 8/2003 | Kuwahara et al. | 455/456 |
| 2003/0193992 A1 | 10/2003 | Challa et al. | |
| 2004/0001464 A1 | 1/2004 | Adkins et al. | |
| 2004/0006696 A1 | 1/2004 | Shin et al. | |
| 2004/0012086 A1 | 1/2004 | Infantolino et al. | |
| 2004/0028003 A1 | 2/2004 | Diener et al. | |
| 2004/0073916 A1 | 4/2004 | Petrovic et al. | |
| 2004/0097190 A1 | 5/2004 | Durrant et al. | |
| 2004/0176026 A1 | 9/2004 | Gainey et al. | |
| 2006/0046642 A1 | 3/2006 | Bassiri et al. | |
| 2007/0052560 A1 | 3/2007 | Van Der Veen et al. | |

FOREIGN PATENT DOCUMENTS

| | | |
|---|---|---|
| EP | 0651360 | 3/1995 |
| EP | 0822674 A1 | 2/1998 |
| EP | 0840533 A2 | 5/1998 |
| EP | 0851695 A2 | 7/1998 |
| EP | 0924878 A2 | 6/1999 |
| EP | 0935356 A2 | 8/1999 |
| EP | 1093273 A1 | 4/2001 |
| EP | 1207404 | 5/2002 |
| GB | 2378614 A | 2/2003 |
| JP | 04-095791 | 3/1992 |
| JP | 2001-209891 | 8/2001 |
| JP | 2001209891 A | 8/2001 |
| JP | 2006-512874 | 4/2006 |
| KR | 20030082363 | 10/2003 |
| KR | 20030088511 | 11/2003 |
| WO | WO9613103 A1 | 5/1996 |
| WO | 9706648 | 2/1997 |
| WO | 9732445 | 9/1997 |
| WO | 9927747 | 6/1999 |
| WO | WO0064091 A2 | 10/2000 |
| WO | 0133302 | 5/2001 |
| WO | WO0150635 A1 | 7/2001 |
| WO | 0199444 | 12/2001 |
| WO | 0217669 | 2/2002 |
| WO | WO0233996 A1 | 4/2002 |
| WO | 02069638 | 8/2002 |
| WO | 02087275 | 10/2002 |
| WO | WO 02087275 | 10/2002 |
| WO | 03036824 | 5/2003 |
| WO | 03044970 | 5/2003 |
| WO | 03061202 | 7/2003 |
| WO | WO03061202 A1 | 7/2003 |
| WO | 03093859 | 11/2003 |
| WO | WO2004095733 A2 | 11/2004 |

OTHER PUBLICATIONS

International Search Report—International Search Authority—PCT/US04/13202—Nov. 3, 2005.
International Search Report—International Search Authority—PCT/US04/13203—Nov. 3, 2005.
International Search Report—International Search Authority—PCT/US03/36083—Apr. 14, 2004.
Written Opinion - PCT/US03/036083, IPEA/US, Jul. 16, 2004.
International Preliminary Examination Report - PCT/US03/036083, IPEA/US, Apr. 29, 2005.
Bavafa, et al., Repeaters for CDMA Systems, 48th IEEE Vehicular Technology Conference, 1998, VTC 98, May 18-21, 1998, vol. 2, pp. 1161-1165.
Simon et al., "Spread Spectrum Communications Handbook," Revised Edition, McGraw-Hill, 1994, ISBN 0-07-057629-7, pp. 11-12.
Telecommunications Industry Association, "Recommended Minimum Performance Standards for Dual-Mode Wideband Spread Spectrum Cellular Mobile Stations," TIA/EIA/IS-98-A, Jul. 1996.

* cited by examiner

APPARATUS AND METHOD FOR DETERMINING THE LOCATION OF A REPEATER

CROSS-REFERENCE TO RELATED APPLICATIONS

This application claims priority to U.S. Provisional Application No. 60/424,821, filed Nov. 8, 2002, and U.S. Provisional Application No. 60/436,393, filed Dec. 23, 2002.

BACKGROUND

1. Technical Field

The disclosure relates generally to wireless communications, and more particularly to an apparatus and method for determining the location of a repeater.

2. Description of the Related Art

Wireless communication systems incorporate the use of repeaters to extend the service area of a base station. Repeaters extend the range of the base station by amplifying and re-transmitting wireless signals sent between a mobile subscriber and a base station.

Although, certain difficulties arise when the mobile subscriber is communicating with the base station via a repeater. In particular, the use of a repeater compromises the ability of a wireless communication system to determine the location of a mobile subscriber. This is due to the fact that signals passing through the repeater are subject to delays that are not present in signals that are transmitted directly from a mobile subscriber to the base station.

Because repeaters are deployed without a means for allowing a receiver to determine whether the signal was transmitted directly from a base station or through the repeater, a position location system using position location methods based upon triangulation or trilateration is not able to determine the location of the receiver. This inability to determine whether a received signal has passed through a repeater further compromises other position location technologies, such as hybrid wireless assisted Global Positioning Systems (GPS).

For example, a hybrid wireless assisted GPS system uses a combination of information from at least one satellite and at least one terrestrial transmission station, such as a base station of a wireless cellular communications system. Hybrid systems also use assistance data containing the fixed locations of base stations for determining the location of a mobile subscriber receiving signals from the base station. The mobile station determines the distance (or relative distance, in some cases) between itself and a base station from which the mobile station is receiving signals. The mobile station does this by determining the time at which the signal from the base station was received. This time may be either the absolute time of arrival or a relative time of arrival taken with respect to other signals received from other sources. Such other sources may be either terrestrial or satellite, for example. Thus, the location of the mobile subscriber is compromised if the propagation delay caused by a repeater is not taken into account.

The propagation delay can be overcome if the location of the repeater is known and can be taken into account during location determination. A method of automatically determining the location of a repeater during or after deployment will meet this need.

SUMMARY

This disclosure is directed to an apparatus and method for determining the location of a repeater. The apparatus includes a repeater and a position location device for determining the location of the repeater.

In a first embodiment, the repeater includes a receiver for receiving signals and a transmitter for transmitting signals. The receiver and transmitter can also be used to repeat signals. A position location device is integrated into the repeater for determining the location of the repeater. The position location device independently receives radio-location signals from one or more devices. The position location device determines the location of the repeater, based on the time of arrival of, or relative time of arrival of, received radio-location signals. In at least some instances, the radio-location signals are transmitted from a position location system, such as a GPS system. Once the position location device determines a location of the repeater, the repeater can store the location. Alternatively, the device can transmit the location to another device that is internal or external to a wireless communication system. For example, the location of the repeater can be transmitted to a communication device, such as a base station, base station controller (BSC), mobile switching center (MSC), or any other similar device. The location of the repeater can be used for various purposes. For example, some cellular communication system base stations maintain a "base station almanac" in which the locations of repeaters in the vicinity of the base station are stored. The location of a repeater stored in such a base station almanac may then be updated using the location information determined by the position location device within the repeater.

In a second embodiment, the repeater includes a receiver and a transmitter. A position location device is integrated into the receiver rather than independent of receiver. In this embodiment, the receiver receives radio-location signals from a position location system, such as a Global Positioning System (GPS). The position location device determines the location of the repeater based on the radio-location signals received by the receiver. The position location device is integrated with the receiver to operate as a complete position location solution. Once the position location device determines a location of the repeater, the repeater can store the location. Alternatively, the repeater can transmit the location to another device that is internal or external to the wireless communication system. The location of the repeater can be used for various purposes, such as updating a base station almanac.

In a third embodiment, the repeater includes a receiver and a transmitter. A position location device is coupled to the repeater via an external connection. In this embodiment, the position location device is independent of the repeater and communicates with the repeater via the external connection. The external connection can be any connection that allows for the position location device to send data to and receive data from the repeater. The external connection can be wireline or wireless. In this embodiment, the position location device receives radio-location signals. Based upon the received radio-location signals, the position location device determines the location of the repeater. In one implementation, the position location device communicates the location to the repeater via an external connection. Once the position location device determines the location of the repeater, the repeater can store the location. Alternatively, the position location device can transmit the location to another device that is either internal or external to the wireless communication system. The location of the repeater can be used for various purposes, such as updating a base station almanac.

In a fourth embodiment, the repeater includes a receiver, a transmitter, and further includes a processor and a memory device. In this embodiment, the position location device can be integrated into the repeater or receiver. Alternatively, the position location device can be coupled to the repeater via an external connection. Either a single processor or multiple processors can process, store, and retrieve data from the memory device. The memory device is coupled to the processor or processors for providing the ability to retrieve and store information. The memory device can be any device that stores and supplies information. For example, the memory device can be, but is not limited to, one or more of the following memory devices: RAM, CD-ROM, DVD, EEPROM, flash memory, floppy disk, hard drive, magnetic media, or any other storage medium. For example, the memory device can include RAM and a hard drive. The processor and memory device provide for the location of the repeater to be stored by the repeater. Alternatively, the location is communicated to other devices.

BRIEF DESCRIPTION OF THE DRAWINGS

The disclosed subject matter can be better understood with reference to the following figures. The components in the figures are not necessarily to scale, emphasis instead being placed upon illustrating the principles of the disclosed subject matter. Moreover, in the figures, like reference numerals designate corresponding parts throughout the different views.

DETAILED DESCRIPTION

Figure 1:
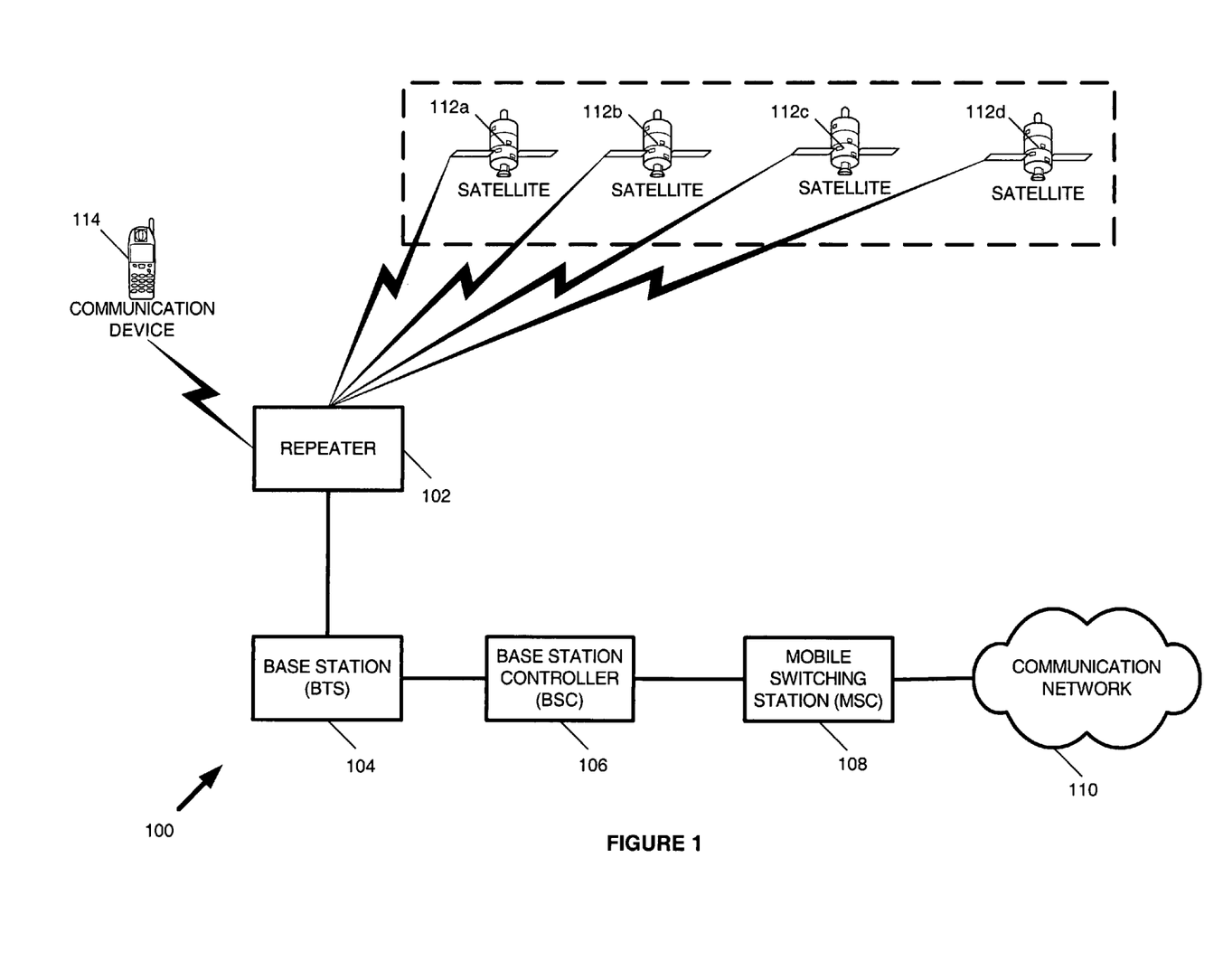
FIG. 1 is a block diagram illustrating a wireless communication system utilizing a repeater.

FIG. 1 illustrates a wireless communication system 100 including a repeater 102, a base station 104, a base station controller (BSC) 106, a mobile switching center (MSC) 108, a communication network 110, satellites 112A-D, and a communication device 114. The repeater 102 communicates with base station 104, satellites 112A-D, and communication device 114.

In one implementation, the repeater 102 receives radio-location signals from satellites 112A-D. The repeater 102 determines its location based on the radio-location signals received from satellites 112A-D. The repeater 102 can also determine its location based on the radio-location signals received from satellites 112A-D and assistance data the repeater 102 receives from the wireless communication system 100. The repeater 102 transmits the determined location to base station 104 or any other device located internal or external to the wireless communication system 100.

The base station 104, also known as a base transceiver subsystem (BTS), can receive the location of the repeater 102 from the repeater 102 itself. The base station 104 can store the location of the repeater 102 or update a base station almanac (BSA) with the location of the repeater 102. The base station 104 can also route the location of the repeater 102 to base station controller 106. The base station controller 106 then routes the location of the repeater 102 to a mobile switching center 108. The mobile switching center 108 can route the location of the repeater 102 to communication network 110.

The base station 104, base station controller 106, mobile switching center 108, or communication network 110 can separately or in combination update a base station almanac with the location of the repeater 102. Additionally, these devices can also store the location of the repeater 102 for purposes other than updating the base station almanac.

The base station almanac maintains information about any portion of the wireless communication system 100. For example, the base station almanac can contain information about a base station or any repeaters within the coverage area of the base station. The information in the base station almanac can include, but not be limited to, broadcast information, antenna patterns, power levels, and location information.

The base station almanac can be accessed and updated by devices that are internal or external to the wireless communication system 100. The base station almanac can reside in any electronic or digital format such as discrete data, a file, or a database. The base station almanac can be stored on a storage medium such as memory, RAM, CD-ROM, DVD, EEPROM, flash memory, floppy disk, hard drive, magnetic media, or any other storage medium. The base station almanac can reside in any device that is internal or external to the wireless communication system 100. For example, the base station almanac can reside in a memory included in base station 104, base station controller 106, mobile switching center 108, or communication device 114.

The base station 104 can receive wireless signals from other devices that do not utilize the repeater 102. The base station controller 106 manages and communicates with multiple base stations such as base station 104. The base station controller 106 also communicates with the mobile switching center 108 to perform call processing.

The mobile switching center 108 handles the processing and routing of calls as well as interfacing to other devices internal or external to the wireless communication system 100. Thus, the mobile switching center 108 may provide interconnections to other networks. For example, the mobile switching center 108 is communicatively coupled to the communication network 110. Communication network 110 can include, but is not limited to, wireless networks, public switched telephone network (PSTN), local telephone networks, long distance telephone networks, satellite networks, ISDN, ATM, GSM, GSPR, client server systems, and the Internet.

The satellites 112A-D are shown for illustrative purposes and are not limited to any particular number of satellites. The satellites 112A-D can be implemented in any combination ranging from one or more satellites for sending radio-location signals to the repeater 102. The satellites 112A-D can be from one or more position location systems such as the Global Positioning System (GPS).

The communication device 114 can be any device that communicates with the repeater 102 or base station 104, for example, a mobile phone, personal digital assistant (PDA), wireless device, laptop, or computer. In one implementation, the communication device 114 transmits a signal to repeater 102. The repeater 102 amplifies and re-transmits the signal to base station 104. The base station 104 routes the signal to the base station controller 106 and the mobile switching center 108 for processing and routing the call.

Figure 2:
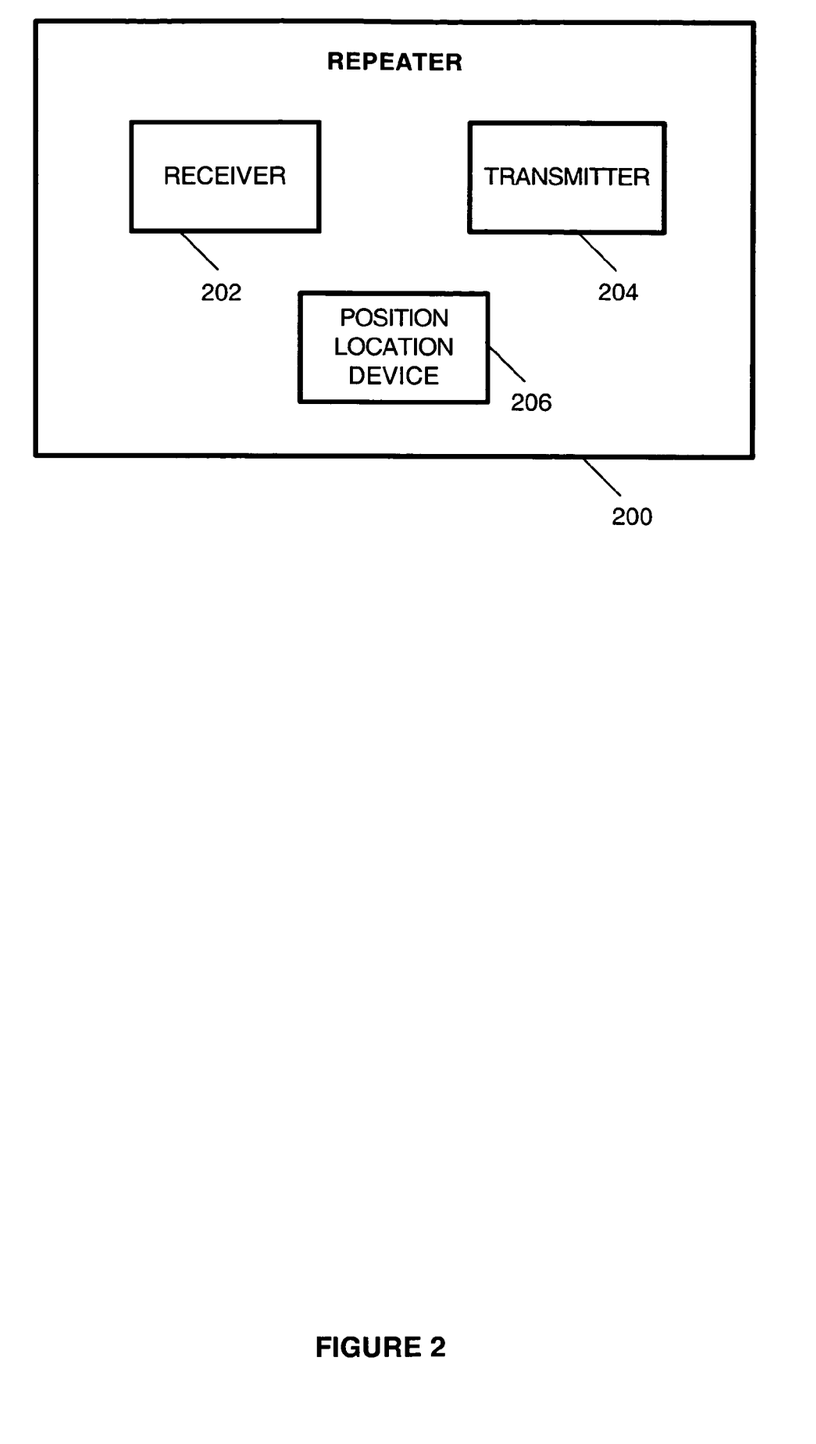
FIG. 2 is a block diagram of a repeater and a position location device in a first embodiment.

FIG. 2 illustrates a first embodiment including a repeater 200 and a position location device 206. The repeater 200 includes a receiver 202 for receiving signals and a transmitter 204 for transmitting signals.

The repeater 200 may include additional components used for receiving signals from and transmitting signals to communication devices, base stations, satellites, and other devices that are internal or external to the wireless communication system 100. For example, the repeater 200 includes an antenna for receiving and transmitting signals along with a power source. The additional components will not be detailed or discussed further because the implementation and use of these additional components are known to those of skill in the art.

The receiver 202 can be any device that receives signals from devices internal or external to the wireless communication system 100. For example, the receiver 202 can receive signals from communication device 114, base station 104, satellites 112A-D, or other similar devices.

The transmitter 204 can be any device that transmits signals from repeater 200. In one implementation, the transmitter 204 can transmit signals received by receiver 202. Accordingly, the receiver 202 and the transmitter 204 can be used to repeat received signals. The transmitter 204 can also be used to transmit information from the repeater 200 or the position location device 206 to other devices. For example, the information can be the location of the repeater 200, repeater configuration/status, or network status information. In another implementation, the receiver 202 and transmitter 204 can be integrated as a transceiver.

The position location device 206 provides for determining a location of the repeater 200. In this embodiment, the position location device 206 is integrated with the repeater 200 as illustrated in FIG. 2. The position location device 206 independently receives radio-location signals from one or more devices. For example, the position location device 206 can receive radio-location signals from satellites 112A-112D. A radio-location signal is any electromagnetic signal that can be propagated through free space. Further, a radio-location signal can be used for providing assistance data for determining the location of an object. It should be understood that radio-location signals may be transmitted by either satellite or terrestrial transmitters and may include signals that have uses other than locating a receiver. For example, signals transmitted by a commercial broadcast FM radio station can be considered as radio-location signals if the time of arrival of such signal is used to locate the receiver. The position location device 206 uses the received radio-location signals to determine a location of the repeater. The position location device 206 can make the location determination using different position location systems, such as the Global Positioning System (GPS). The location determination can be performed on-demand, during a predetermined interval, based on a criteria, responsive to a query, on an automated basis, during initialization of the repeater, during power up of the repeater, during initial deployment of the repeater, during self-initialization, or in any similar manner. Thus, the repeater 200 can independently initialize the determination process for updating its location.

The position location device 206 can be any device that provides for determining the location of the repeater. In one implementation, the position location device 206 is a GPS receiver and receives radio-location signals from at least one satellite within the GPS satellite constellation to determine the location of the repeater.

In another implementation, the position location device 206 is a GPS receiver utilizing hybrid wireless assisted GPS. In this implementation, the position location device 206 receives radio-location signals from at least one satellite and assistance data from the wireless communication system 100 to determine the location of the repeater. The assistance data may contain the fixed location of bases stations or other devices for helping to determine the location of the repeater 200. The assistance data may also be supplied by the repeater 200. The repeater 200 may have integrated components that supply assistance data in helping to determine the location of the repeater 200. For example, the repeater 200 may have an integrated altimeter. In certain repeater configurations such as an indoor deployment, the altimeter can help to determine which floor the repeater is located on.

In another implementation, the position location device 206 is a wireless device. The wireless device can be, but is not limited too, a cellular phone, mobile phone, computer, laptop, PDA (Personal Digital Assistant), or any similar device.

Once the position location device 206 determines a location of the repeater 200, the repeater 200 can store the location or transmit the location to a device that is internal or external to the wireless communication system 100. For example, the location of the repeater can be transmitted to a communication device 114, base station 104, base station controller (BSC) 106, mobile switching center (MSC) 108, or any similar related devices. The location of the repeater 200 can be used for various purposes such as updating a base station almanac.

Figure 3:
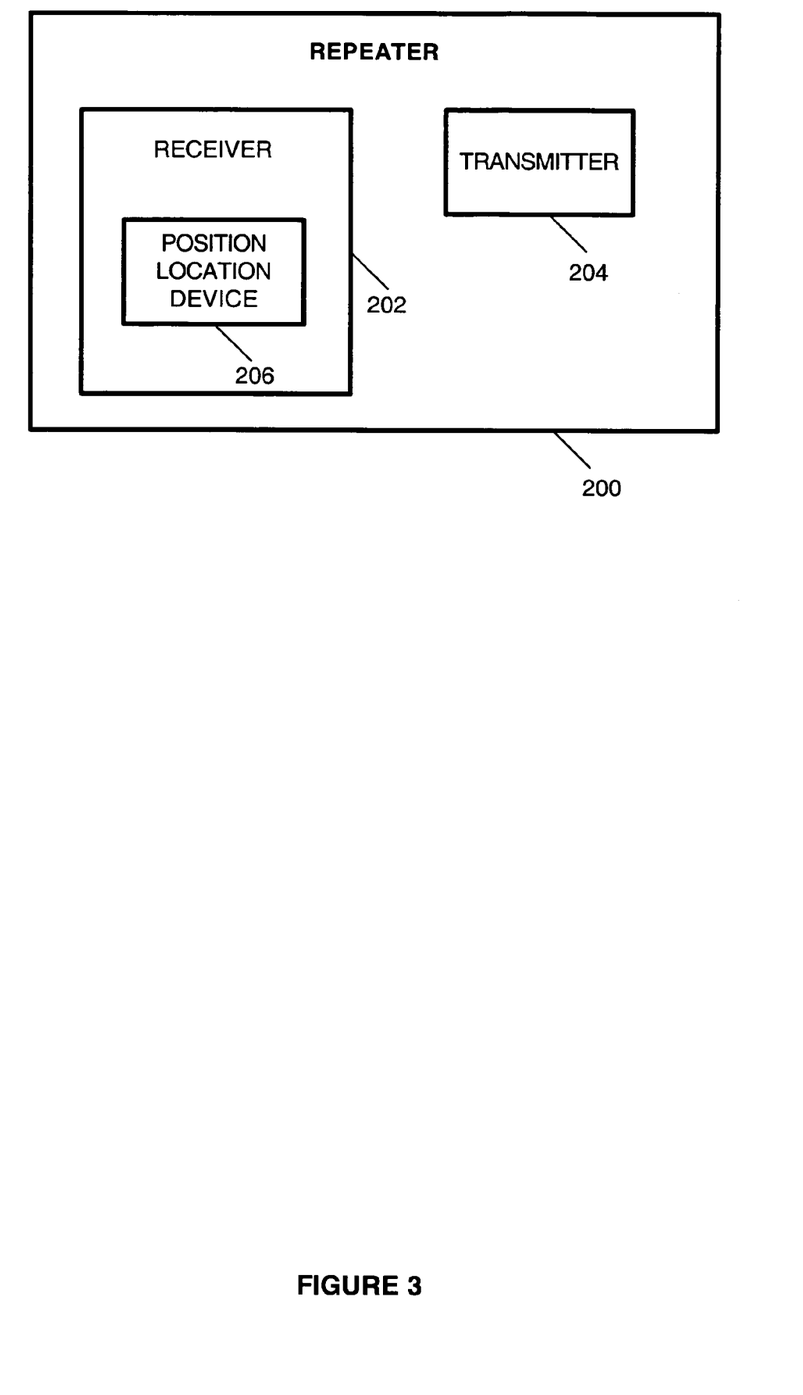
FIG. 3 is a block diagram of a repeater and a position location device in a second embodiment.

FIG. 3 illustrates a second embodiment including repeater 200 and position location device 206. In this second embodiment, the repeater 200 includes, as before, a receiver 202 and a transmitter 204, but with the position location device 206 integrated with the receiver 202 rather than independent of receiver 202 as illustrated in FIG. 2.

In this embodiment, the receiver 202 receives radio-location signals and the position location device 206 determines a location of the repeater 200 based on the radio-location signals received by the receiver 202. The receiver 202 receives radio-location signals from position location systems such as the GPS system. For example, the receiver 202 receives radio-location signals from satellites 112A-D. The position location device 206 is integrated with the receiver 202 to operate as a complete position location solution.

In one implementation, the receiver 202 and the position location device 206 are integrated together in an integrated chip (IC), application specific integrated chip (ASIC), or other semiconductor device. In another implementation, the receiver 202, transmitter 204, and the position location device 206 are integrated together in an integrated chip (IC), application specific integrated chip (ASIC), or other semiconductor device.

The receiver 202 also receives signals from devices internal or external to the wireless communication system 100. For example, the receiver 202 can receive signals from communication device 114, base station 104, satellites 112A-D, or similar devices. These signals can comprise voice and data information generally communicated over the wireless communication system 100, such as by mobile subscribers.

The transmitter 204 retransmits the signals received by receiver 202. Thus, the receiver 202 and the transmitter 204 are used to repeat received signals. The transmitter 204 can also be used to transmit information from the repeater 200. For example, the transmitter 204 can transmit the location of the repeater to devices that are internal or external to the wireless communication system 100.

Once the position location device 206 determines a location of the repeater, the repeater 200 can store the location or transmit the location to a device that is internal or external to the wireless communication system 100. For example, the location of the repeater can be transmitted to a communication device 114, base station 104, base station controller (BSC) 106, mobile switching center (MSC) 108, or any similar related device. The location of the repeater can be used for various purposes such as updating a base station almanac.

Figure 4:
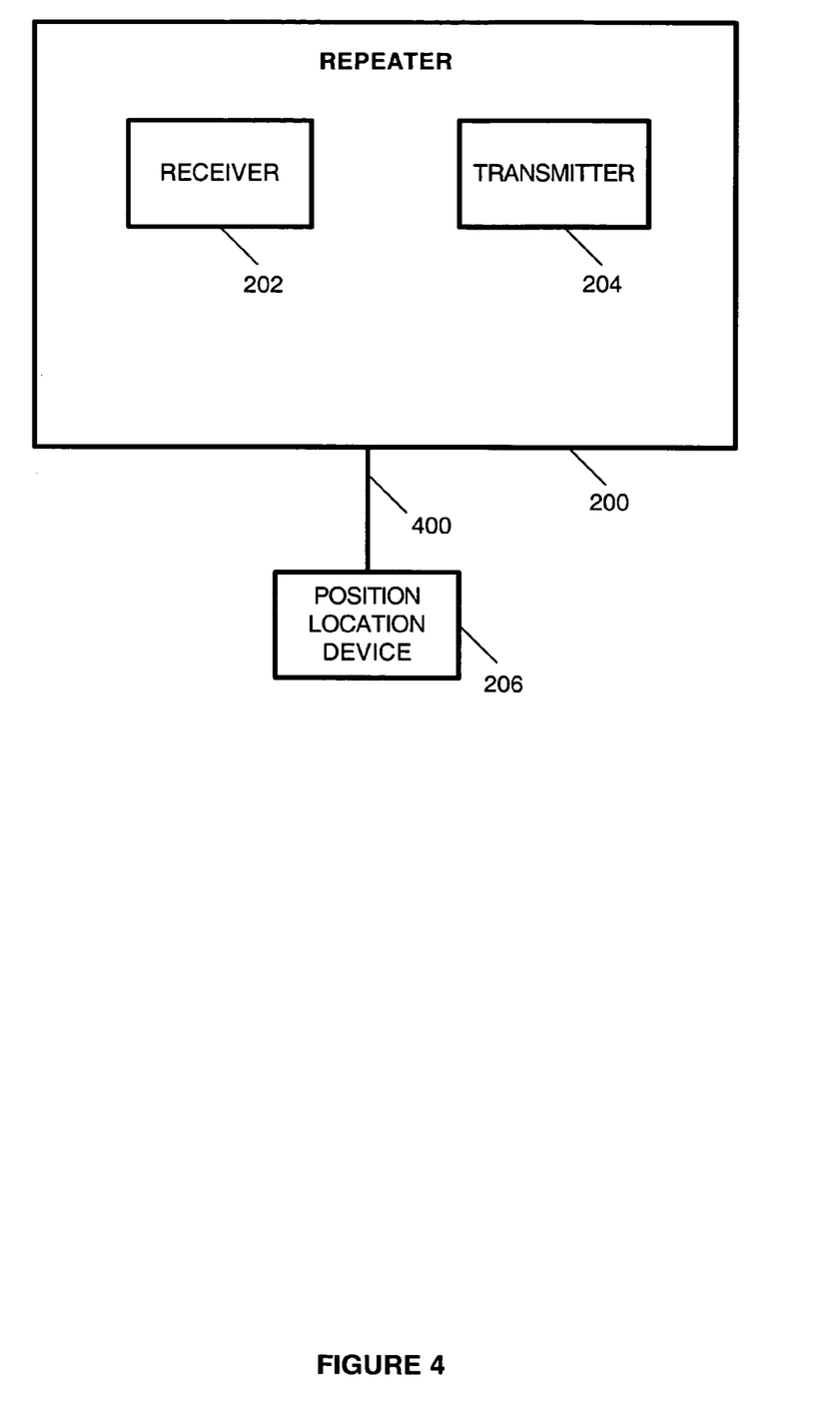
FIG. 4 is a block diagram of a repeater and a position location device in a third embodiment.

FIG. 4 illustrates a third embodiment including repeater 200 and position location device 206. In this third embodiment, the repeater 200 includes, as before, a receiver 202 and a transmitter 204, but with the position location device 206 coupled to the repeater via an external connection 400.

In this embodiment, the position location device 206 is independent of the repeater 200 and communicates with the repeater 200 via the external connection 400. The external connection 400 can be any connection that allows for the position location device 206 to send data to and receive data from the repeater 200. The external connection 400 can be wireline or wireless.

In a wireline implementation, the wireline connection can be, but need not be limited to, a cable, wire, Ethernet cable, optic fiber, coaxial, network, or similar wireline connection. In a wireless implementation, the wireless connection can be made by, but not limited to, Bluetooth, WAP (Wireless Access Protocol), 802.11b, optically, infrared, CDMA, TDMA, GSM, or similar wireless connection.

In this embodiment, the position location device 206 receives radio-location signals and determines the location of the repeater 200 based on the radio-location signals. In one implementation, once the position location device 206 determines a location of the repeater 200, the position location device 206 communicates the location to the repeater 200 via external connection 400. The repeater 200 can store the location or transmit the location to a device that is internal or external to the wireless communication system 100. For example, the location of the repeater 200 can be transmitted to a communication device 114, base station 104, base station controller (BSC) 106, mobile switching center (MSC) 108, or any similar related devices. The location of the repeater 200 can be used for various purposes such as updating a base station almanac.

In another implementation, the position location device 206 communicates the location of the repeater 200 to an external device. For example, the position location device 206 can communicate the location of the repeater to a communication device 114, base station 104, base station controller (BSC) 106, mobile switching center (MSC) 108, communication network 110, or any other similar related devices via a wireless or wireline connection.

Figure 5:
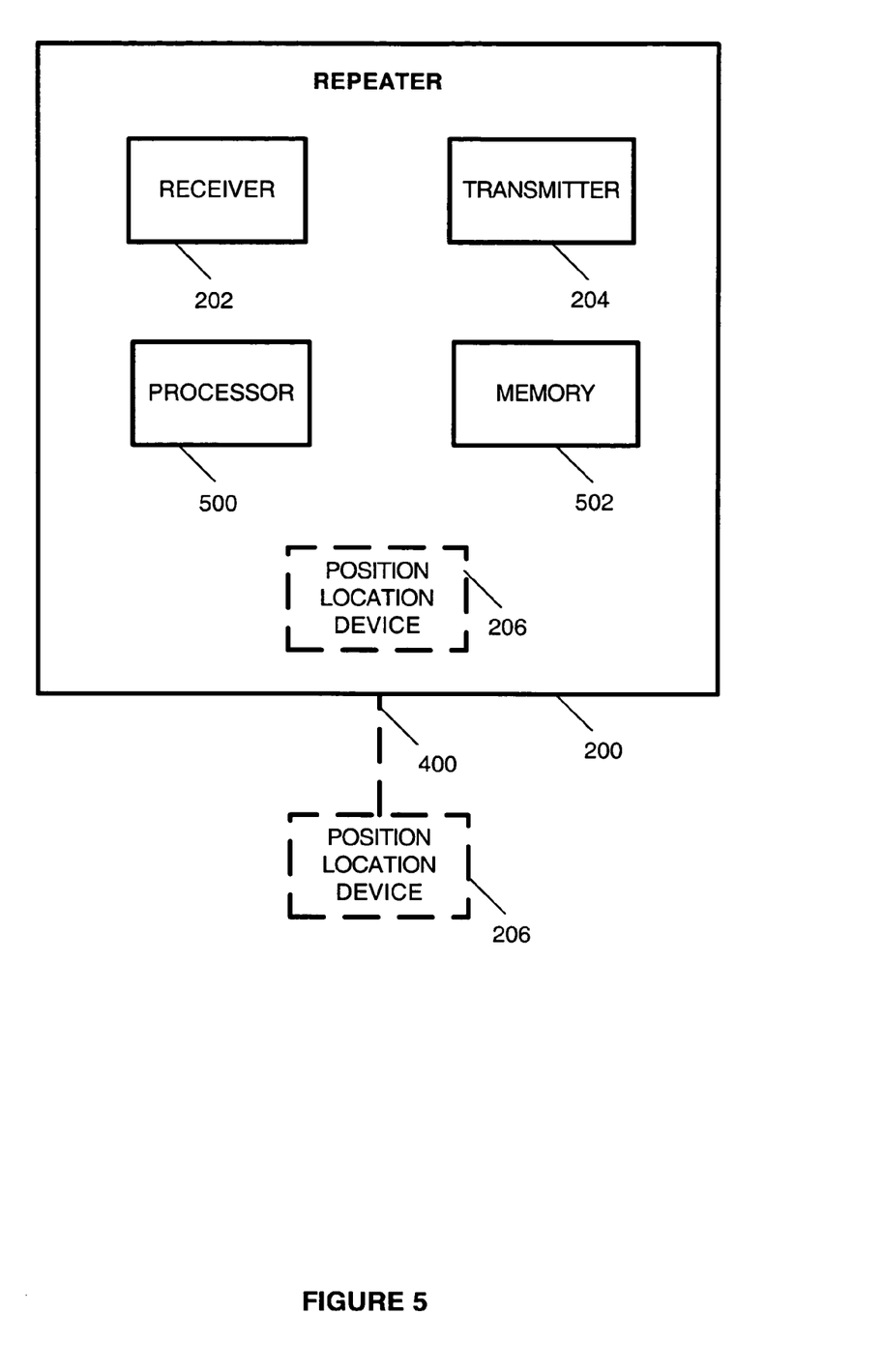
FIG. 5 is a block diagram of a repeater and a position location device in a fourth embodiment.

FIG. 5 illustrates a fourth embodiment including repeater 200 and position location device 206 in which, compared to FIGS. 2-4, like elements are referenced with like identifying numerals. In this fourth embodiment, the repeater 200 includes as before a receiver 202, a transmitter 204, and further a processor 500 and a memory device 502.

In this embodiment, as noted by the dashed lines, the position location device 206 can be integrated with the repeater 200 or receiver 202 as detailed in FIGS. 2-3 or be coupled to the repeater 200 via an external connection 400 as detailed in FIG. 4. The processor 500 can comprise one or more processors for processing, storing, and retrieving data from the memory device 502.

The memory device 502 is coupled to the processor 500 for providing the ability to store information. The memory device 502 can be any device that stores and supplies information. For example, the memory device 502 can be, but is not limited to, memory, RAM, CD-ROM, DVD, EEPROM, flash memory, floppy disk, hard drive, magnetic media, or any other storage medium. The memory device 502 can be one or more memory devices depending upon the configuration of the repeater 200. For example, the memory device 502 can include both RAM and a hard drive. The processor 500 and memory device 502 provide for the location of the repeater 200 to be stored by the repeater 200 itself.

Depending on the configuration of the repeater 200, the location of the repeater 200 can be determined manually and/or automatically. In one implementation, the location of the repeater 200 is entered into the repeater 200 manually. For example, a field service worker manually enters the location of the repeater 200. The manual entry process can be performed by well known methods of data entry such as by a keyboard, wirelessly, network, or other entry method.

In another implementation, the location of the repeater 200 is entered into the repeater 200 by a device. The repeater 200 communicates with a device to allow for the entry of the location of the repeater 200 or to provide information. The repeater 200 can communicate with other devices via wireline or wireless connections. In a wireline implementation, the wireline connection can be, but not limited to, a cable, wire, Ethernet cable, optic fiber, coaxial, network, or similar wireline connection. In a wireless implementation, the wireless connection can be made by, but not limited to, Bluetooth, WAP (Wireless Access Protocol), 802.11b, optically, infrared, CDMA, TDMA, GSM, or similar wireless connection. The Internet can also be used as a communication medium for the repeater 200 and other devices to communicate.

For example, a communication device 114 communicates with the repeater 200 to provide the location of the repeater 200. The processor 500 receives the location information and stores the location of the repeater 200 into memory device 502. Processor 500 can also retrieve the stored location of the repeater 200 for processing or updating by the communication device 114.

In another implementation, position location device 206 automatically determines the location of the repeater 200. The position location device 206 can dynamically determine the location of the repeater 200 based on a criteria. Once the position location device 206 determines a location of the repeater 200, the processor 500 can store the location of the repeater 200 in the memory device 502. Thus, processor 500 can retrieve the location of the repeater 200 from the memory device 502 for use by the repeater 200. The processor 500 can also retrieve the location of the repeater 200 from memory device 502 to communicate the location of the repeater 200 to an external device. For example, in response to a query, the processor 500 retrieves the location of the repeater 200 from memory 502 and communicates the location to an external device. The external device can be a device that is internal or external to the wireless communication system 100, for example, a communication device 114, a base station 104, satellites 112A-D, a remote computer, a network, or any similar device.

Figure 6:
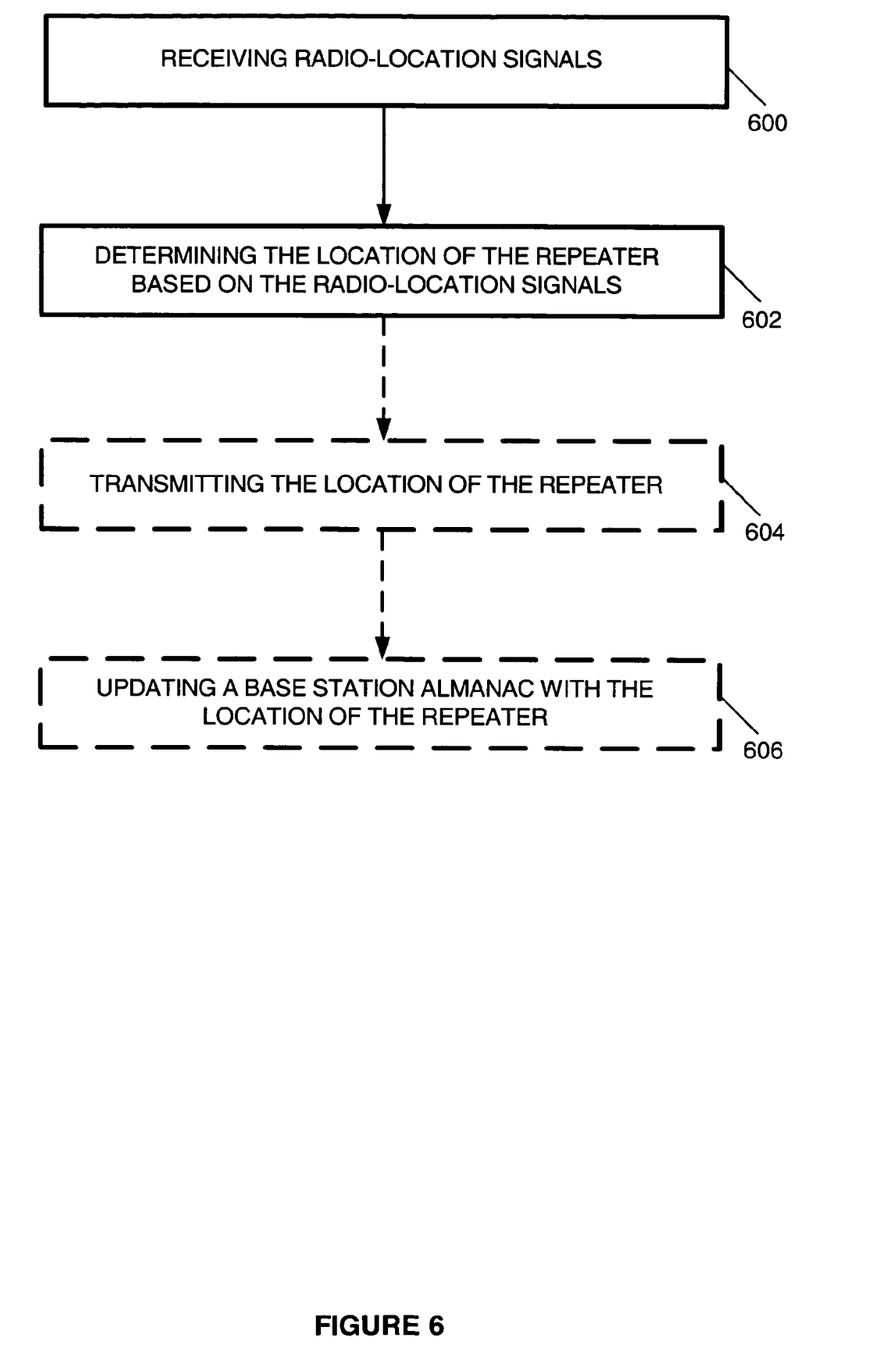
FIG. 6 is a flow diagram illustrating a method for determining a location of a repeater.

FIG. 6 is a flow diagram illustrating a method for determining a location of a repeater 200. The method begins in block 600, where radio-location signals are received. In block 602, the location of the repeater 200 is determined based on the radio-location signals that are received.

In one implementation, repeater 200 receives the radio-location signals and the position location device 206 determines the location of the repeater 200 based on the radio-location signals. In another implementation, position location device 206 receives the radio-location signals and determines the location of the repeater 200 based on the radio-location signals. As detailed in FIGS. 2-5, the method may be implemented using various embodiments and configurations of the repeater 200, receiver 202, and position location device 206.

The method of FIG. 6 may further include block 604 and block 606 as shown by the dashed lines. In block 604, the method may further include the repeater 200 transmitting the location of the repeater 200. The repeater 200 can transmit the location of the repeater 200 in response to a query, during a predetermined time interval, during a dynamically determined time interval, during initial initialization, during initial deployment, on an automated basis, based on a performance criteria, or any other determined criteria.

In block 606, the method may further include updating a base station almanac with the location of the repeater 200. Referring to FIG. 1, the base station 104, base station controller 106, mobile switching center 108, communication network 110, or similar device can separately or in combination update the base station almanac with the location of the repeater 200. The base station almanac can be accessed and updated by devices that are internal or external to the wireless communication system 100.

For example, base station 104 receives the location of the repeater 200 from the repeater 200. The base station 104 updates the base station almanac stored in the base station with the location of the repeater 200. In another example, base station 104 receives the location of the repeater 200 from the repeater 200. The base station 104 communicates with another device to update the base station almanac stored within the device with the location of the repeater 200.

Figure 7:
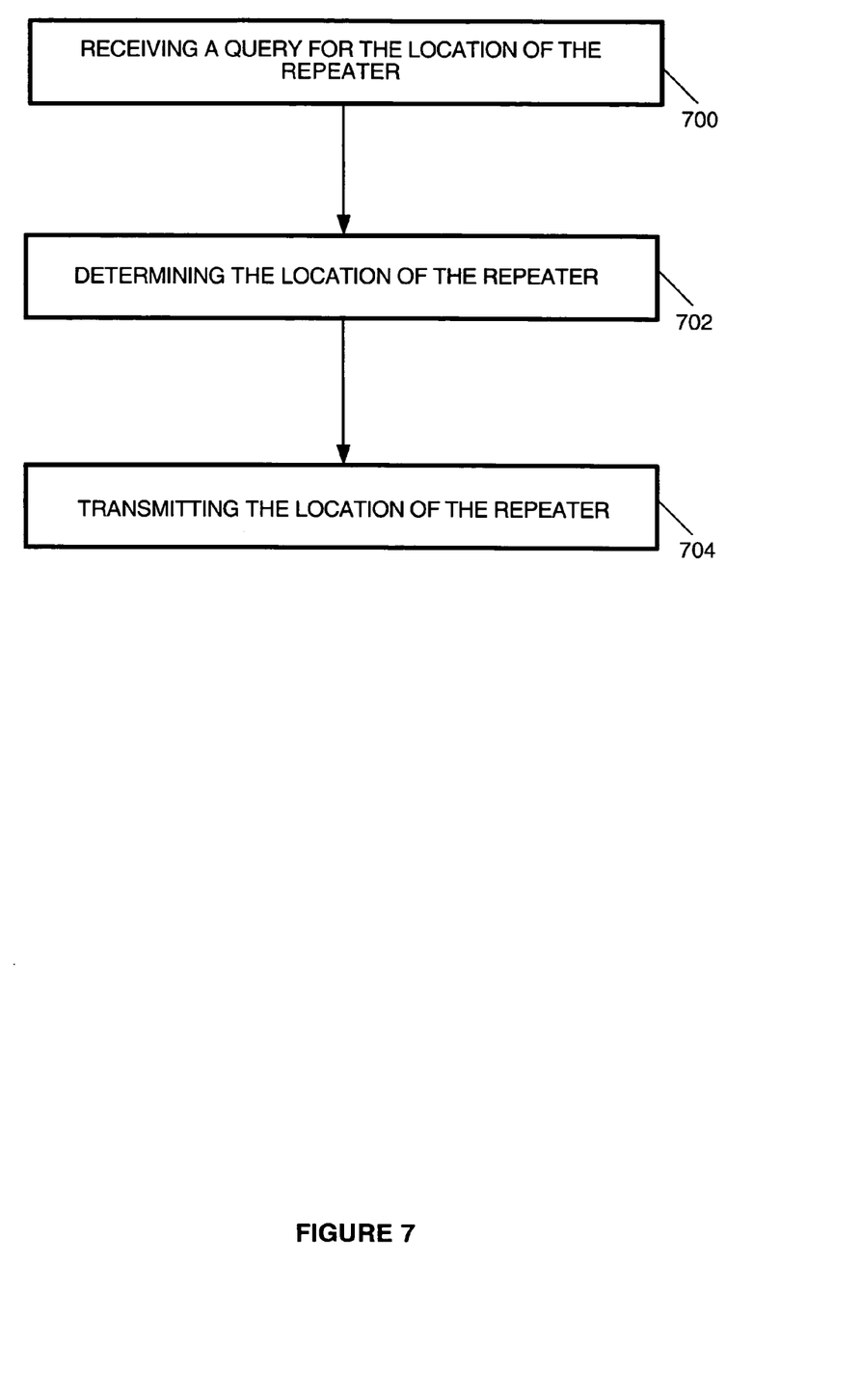
FIG. 7 is a flow diagram illustrating a method for updating a location of a repeater.

FIG. 7 is a flow diagram illustrating a method for updating a location of a repeater 200. The method starts in block 700, where repeater 200 receives a query for the location of the repeater 200.

The query can be sent by devices that are internal or external to the wireless communication system 100. For example, base station 104, base station controller 106, mobile switching station 108, communication network 110, communication device 114, and similar devices can send a query to the repeater 200. The query can be sent based on a predetermined time interval, during a dynamically determined time interval, during initialization, during initial deployment, on an automated basis, based on a performance criteria, or any other determined criteria.

In block 702, the repeater 200 determines the location of the repeater 200. Depending upon the configuration of the position location device 206 with repeater 200, the position location device 206 determines the location of the repeater 200.

In block 704, the repeater 200 transmits the location of the repeater 200. The location of the repeater 200 can be received by any device that is internal or external to the wireless communication system 100. For example, the location of the repeater 200 can be received by base station 104, base station 106, mobile switching station 108, communication network 110, communication device 114, or any similar device.

Figure 8:
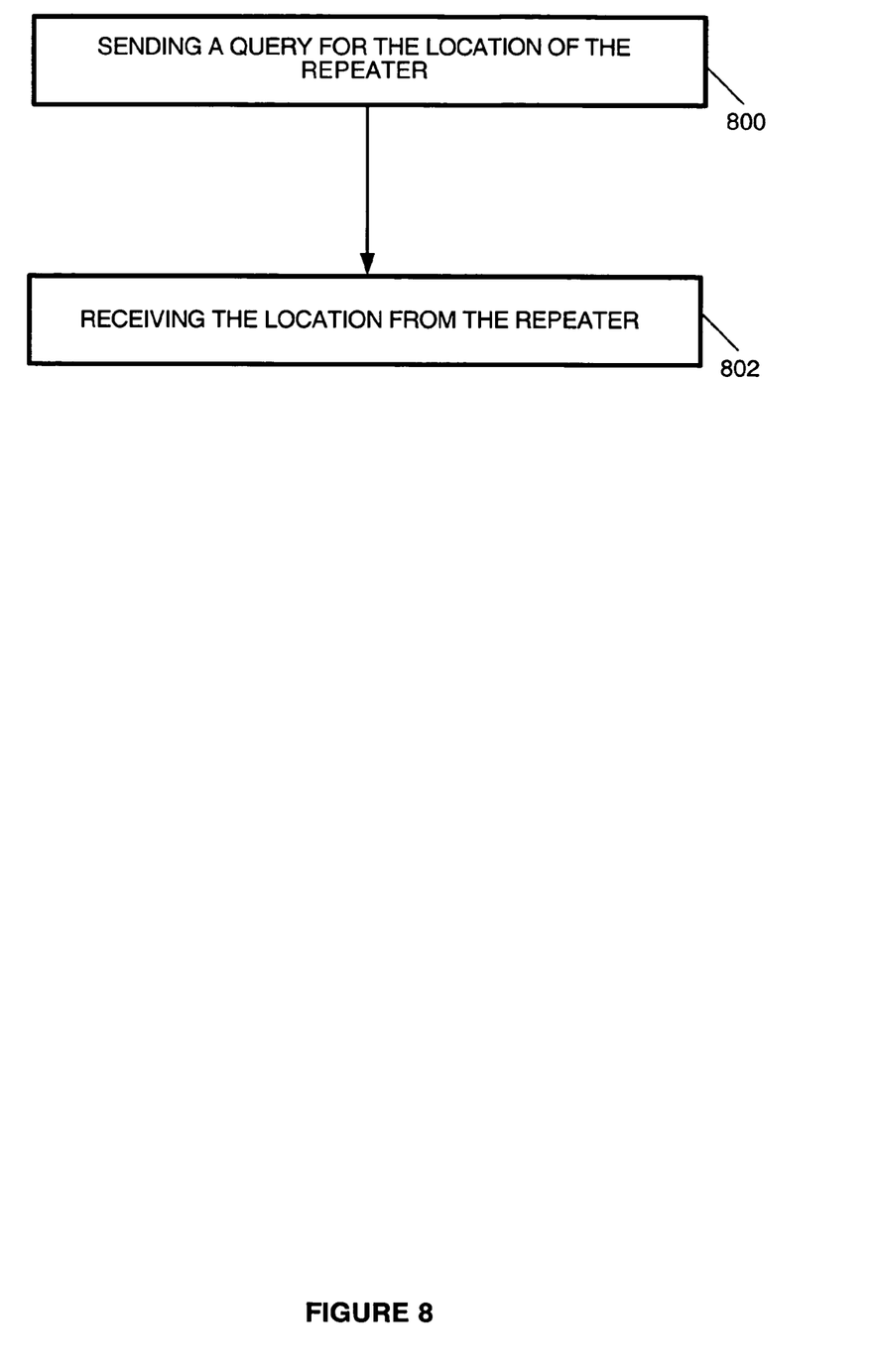
FIG. 8 is a flow diagram illustrating a method of querying the location of a repeater.

FIG. 8 is a flow diagram illustrating a method for querying the location of a repeater 200. The method starts in block 800, where a query for the location of the repeater 200 is sent to the repeater 200. The repeater 200 receives the query for the location of the repeater 200 and determines the location of the repeater 200.

The query can be sent by any device that is internal or external to the wireless communication system 100. For example, the query can be sent by base station 104, base station 106, mobile switching station 108, communication network 110, communication device 114, or any other similar device. The query can be sent based on a predetermined time interval, during a dynamically determined time interval, during initialization, during initial deployment, on an automated basis, based on a performance criteria, or any other determined criteria.

In block 802, the location of the repeater 200 is received from the repeater 200. The location of the repeater 200 can be received by any device that is internal or external to the wireless communication system 100. For example, the location of the repeater 200 can be received by base station 104, base station 106, mobile switching station 108, communication network 110, communication device 114, or any similar device.

Figure 9:
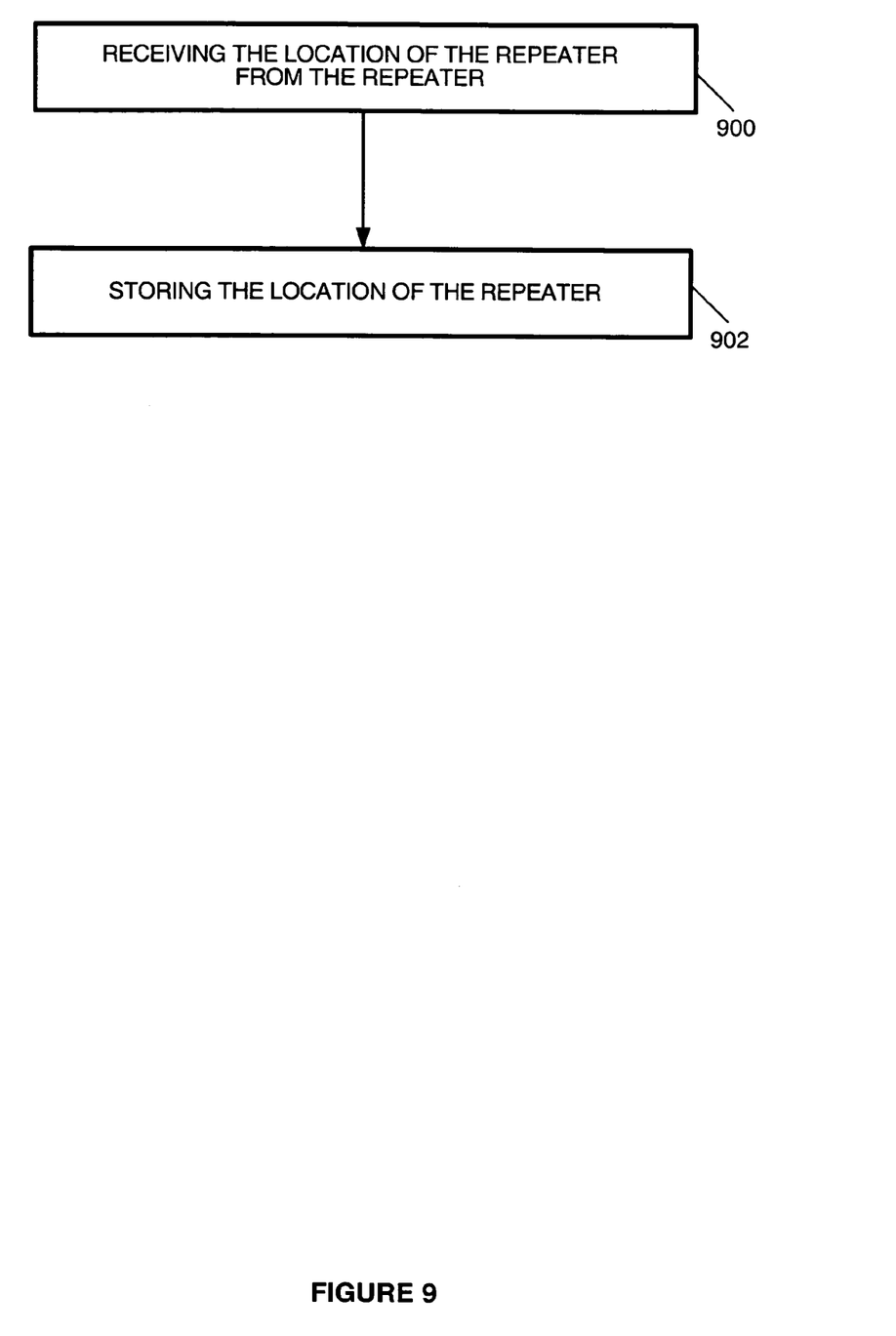
FIG. 9 is a flow diagram illustrating a method for storing the location of a repeater.

FIG. 9 is a flow diagram illustrating a method for storing the location of a repeater 200. The method starts in block 900, where the location of the repeater 200 is received from the repeater 200.

The repeater 200 sends the location of the repeater 200 in response to a query, during a predetermined time interval, during a dynamically determined time interval, during initial initialization, during initial deployment, on an automated basis, based on a performance criteria, or any other determined criteria.

In block 902, the location of the repeater 200 is stored. The base station 104, base station controller 106, mobile switching center 108, communication network 110, and communication device 114, or similar device can receive and store the location of the repeater 200. The stored repeater location can be used for various purposes including updating a base station almanac. The base station almanac can be updated before, after, or simultaneously with receiving or storing the location of the repeater 200.

In one implementation, the repeater 200 transmits the location of the repeater 200 to base station 104. The base station 104 receives the location of the repeater 200 and stores the location within the base station 104. The base station 104 uses the stored repeater location to update a base station almanac stored in the base station 104 or within another device.

While various embodiments of the disclosed subject matter have been described, it will be apparent to those of ordinary skill in the art that many more embodiments and implementations are possible that are within the scope of this disclosed subject matter.

What is claimed is:

1. A system comprising:
   a repeater including a receiver, amplification circuitry, and a transmitter disposed on the repeater, the repeater to receive signals transmitted by a base station of a wireless cellular system using the receiver, amplify the received signals using the amplification circuitry, and transmit amplified signals to a mobile station coupled to the wireless cellular system using the transmitter;
   a position location device operatively located with and coupled to the repeater, the position location device to receive radio-location signals, and based at least in part on the radio-location signals determine location information associated with a location of the repeater; and
   at least one device to maintain a base station almanac to store at least location information associated with locations of a plurality of base stations of the wireless cellular system and the location information associated with the location of the repeater, and receive the location information associated with the location of the repeater from at least one of the repeater and/or the position location device, and wherein the stored location information associated with the location of the repeater is accessible and usable to account for at least one propagation delay associated with at least one amplified signal transmitted by the repeater and received by the mobile station during a subsequent location determination process associated with the mobile station.

2. The system of claim 1, wherein the position location device is integrated with the repeater.

3. The system of claim 1, wherein the position location device is coupled to the repeater by an external connection.

4. The system of claim 1, wherein the position location device comprises a GPS receiver.

5. The system of claim 1, wherein the position location device comprises a mobile station for use with the wireless cellular system.

6. The system of claim 1, wherein the position location device is capable of determining the location information associated with the location of the repeater based on radio-location signals received by the receiver.

7. The system of claim 1, wherein the position location device is capable of determining the location information associated with the location of the repeater based on radio-location signals received by the position location device.

8. The system of claim 1, wherein the transmitter is capable of transmitting the location information associated with the location of the repeater.

9. The system of claim 1, wherein the transmitter is capable of transmitting the location information associated with the location of the repeater to an external device to update the base station almanac.

10. The system of claim 9, wherein the external device comprises at least one of the plurality of base stations.

11. The system of claim 1, wherein the at least one device comprises at least one of the plurality of base stations.

12. The system of claim 11, wherein the base station is capable of routing the location information associated with the location of the repeater to another device.

13. The system of claim 11, wherein the base station is capable of querying the repeater for the location information associated with the location of the repeater.

14. The system of claim 1 further comprising a second receiver including the position location device, wherein the position location device determines the location information associated with the location of the repeater based on radio-location signals received by the second receiver.

15. The system of claim 1 wherein the base station almanac comprises at least one memory device for storing the location information associated with the location of the repeater.

16. The system of claim 15 further comprising a processor to retrieve the location information associated with the location of the repeater from the at least one memory device.

17. The system of claim 16 further comprising a transmitter for transmitting the received signals and the location information associated with the location of the repeater retrieved by the processor.

18. A method comprising:
with a repeater, receiving signals transmitted by a base station of a wireless cellular system and transmitting the signals to a mobile station coupled to wireless cellular system;
receiving radio-location signals with a position location device located with and operatively coupled to the repeater;
with the position location device, determining location information associated with the location of the repeater based on the radio-location signals;
transmitting the location information associated with the location of the repeater to at least one device using at least one of the repeater and/or the position location device;
storing the location information associated with the location of the repeater in base station almanac to store at least location information associated with a plurality of base stations of the wireless cellular system and the location information associated with the location of the repeater; and
during a subsequent location determination process associated with the mobile station accessing and using the stored location information associated with the location of the repeater to account for at least one propagation delay associated with at least one signal retransmitted by the repeater and received by the mobile station.

19. The method of claim 18, wherein the radio-location signals include assistance data.

20. The method of claim 18, wherein the location information associated with the location of the repeater is transmitted by the repeater in response to a query.

21. The method of claim 18, wherein the location information associated with the location of the repeater is transmitted by the repeater during a predetermined time interval.

22. The method of claim 18, wherein the location information associated with the location of the repeater is transmitted by the repeater during initial initialization.

23. The method of claim 18, wherein the location information associated with the location of the repeater is transmitted by the repeater on an automated basis.

24. The method of claim 18, wherein the at least one device comprises a base station.

* * * * *